April 11, 1950 W. F. KANNENBERG 2,503,391

AUTOMATIC VOLUME CONTROL

Filed Jan. 6, 1949 2 Sheets-Sheet 1

INVENTOR
W. F. KANNENBERG
BY D. MacKenzie
AGENT

April 11, 1950 W. F. KANNENBERG 2,503,391

AUTOMATIC VOLUME CONTROL

Filed Jan. 6, 1949 2 Sheets-Sheet 2

INVENTOR
W. F. KANNENBERG
BY D. MacKenzie
AGENT

Patented Apr. 11, 1950 2,503,391

UNITED STATES PATENT OFFICE 2,503,391

AUTOMATIC VOLUME CONTROL

Walter F. Kannenberg, Gillette, N. J., assignor to Bell Telephone Laboratories, Incorporated, New York, N. Y., a corporation of New York Application January 6, 1949, Serial No. 69,579

5 Claims. (Cl. 179—1)

This invention relates to an improved automatic volume control system adapted to control the level of a sound program reproduced in the presence of noise in a listening area. The invention contemplates the reproduction, in a noisy room, of program selections with intervening intervals of no program and provides means for controlling in each program period the gain of the sound reproducing system in accordance with the noise level of the preceding interval of no program.

The volume control system herein disclosed is therefore referred to as an "interval-adjusting" system and its operation serves to fix the reproducing gain during a no-program interval at such a value that the next ensuing program shall be reproduced at a sound level high enough to be conveniently heard above the noise level, if the noise continues at the same level during the program as prior to the beginning thereof. Provision is also made for disabling the volume control from making further changes in reproducing gain during the rendition of a program selection, except when an excessive burst of noise in the listening area occurs in the course of such rendition. The reproduced program may be directly picked up by a microphone, received by radio or reproduced from a sound record on disc or photographic film.

The general object of the invention is to provide a method and system of apparatus enabling a sound program to be presented in a listening area at a sound level sufficiently high to override the noise therein.

The system of apparatus to be described is wholly electrical, requiring no mechanical or electromechanical elements, and the provision of a wholly electrical system for the purpose stated is also an object of the invention.

The general method of interval-adjusting gain control herein applied is disclosed and claimed in the copending application of H. W. Augustadt, Automatic volume control, filed September 17, 1949, Serial No. 116,397, assigned to the same assignee as the present invention. In that Augustadt application there is disclosed and claimed an electromechanical system for such control.

A further object is to provide a volume control system controlling the level of sound reproduction in accordance with the level of noise in the interval preceding the reproduction.

Another object is to provide, in such a volume control system, means for disabling the volume control from making further level changes after sound reproduction begins and to reestablish the volume control when the sound reproduction ends.

In effecting the control of sound level to enable a program to be heard above the ambient noise in the listening area, it is not required that the level difference between program and noise have always a prescribed value. Such a requirement would lead in some cases to excessively high program levels which would be objectionable if a sudden drop in noise level took place.

A feature of the invention is the inclusion, in the system of apparatus herein disclosed, of a limiting element which enables the program channel gain to rise at first proportionally to the rise in noise level, then more slowly as the noise continues to rise, and finally to become substantially constant.

As already indicated, provision is made for arresting the change in program channel gain when a program rendition begins and reestablishing the gain control in accordance with the level of ambient noise as soon as the rendition ends. In the circuit portion producing this arrest and subsequent reestablishment, a limiting element is provided which allows the reestablishment to be substantially equally rapid whether the program ends at high or low level. This is another feature of the invention.

In the prior art there are disclosures of continuously adjusting volume control systems controlling the program channel gain to rise and fall with similar changes in ambient noise, throughout the rendition of the program. Such a system is shown, for example, in United States Patent 2,338,551, January 4, 1944 to E. Stanko. While continuously adjusting systems are useful, they have the disadvantage that where frequent and substantial changes in noise level occur during the program, the consequent changes in program level may spoil the artistic character of the reproduction. The avoidance of this effect is another object of the present invention, which allows the program channel gain to vary continuously with noise level during an interval between program selections but fixes that gain, throughout the rendition of a selection, at the value established by the preceding noise level.

For a full understanding of the invention the reader is referred to the following description of a preferred embodiment thereof, with the accompanying drawings in which.

Figure 1:
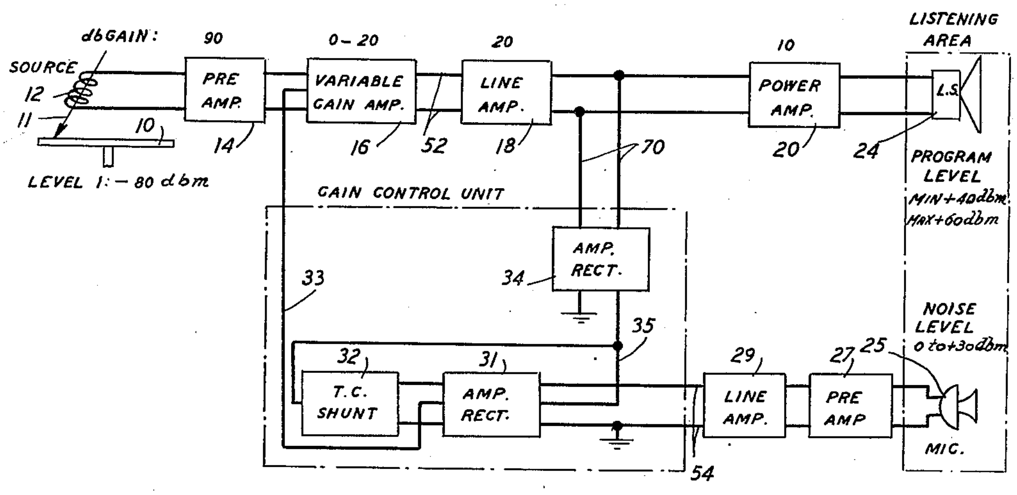
Fig. 1 is a block schematic of the system of the invention as applied to the reproduction of a disc record.

Referring now to Fig. 1, a phonograph disc 10 is driven by mechanism not shown and its sound record is translated into voltage variations by an electromechanical reproducer symbolized by stylus 11 and coil 12. The voltage variations between the terminals of coil 12 are amplified by preamplifier 14. If the fortissimo level of the record reproduced from disc 10 is —80 dbm (decibels above 1 miliwatt), the gain of amplifier 14 is suitably 90 decibels to raise the sound voltage to a convenient level of +10 dbm for application to the succeeding amplifiers of the program channel. These include in tandem variable gain amplifier 16, line amplifier 18 and power amplifier 20 supplying loudspeaker 24 with an electrical power level suitably high for sound reproduction in the listening area. This power level may be from +35 dbm to +50 dbm or even higher, depending on the noise level in the listening area before the reproduction begins.

The gain of line amplifier 18 is adjustable and is set, during a period of silence in the listening area, to such a value that record 10 is reproduced from loudspeaker 24 at a satisfactory level. Variable gain amplifier 16 is at this time arranged to have zero db gain. This condition of the reproducing channel between record 10 and loudspeaker 24 is called the "reference condition."

In the listening area, microphone 25 picks up sound in the area, either program or noise, translates the sound into electrical voltages amplified by amplifier 27, to a level which by amplifier 29 is lifted approximately to the level of the program power at the output of amplifier 18. Within the dashed rectangle labeled "Gain control unit" are included the circuit elements particularly described in connection with Fig. 4. These elements, symbolically shown in Fig. 1, comprise an amplifier-rectifier 31 including a time-constant circuit of which the time constant is controlled by a shunt circuit 32. From amplifier-rectifier 31, a rectified control voltage conditionally proportional to the output voltage from microphone 25 is applied via conductor 33 to control the gain of variable gain amplifier 16.

Figure 4:
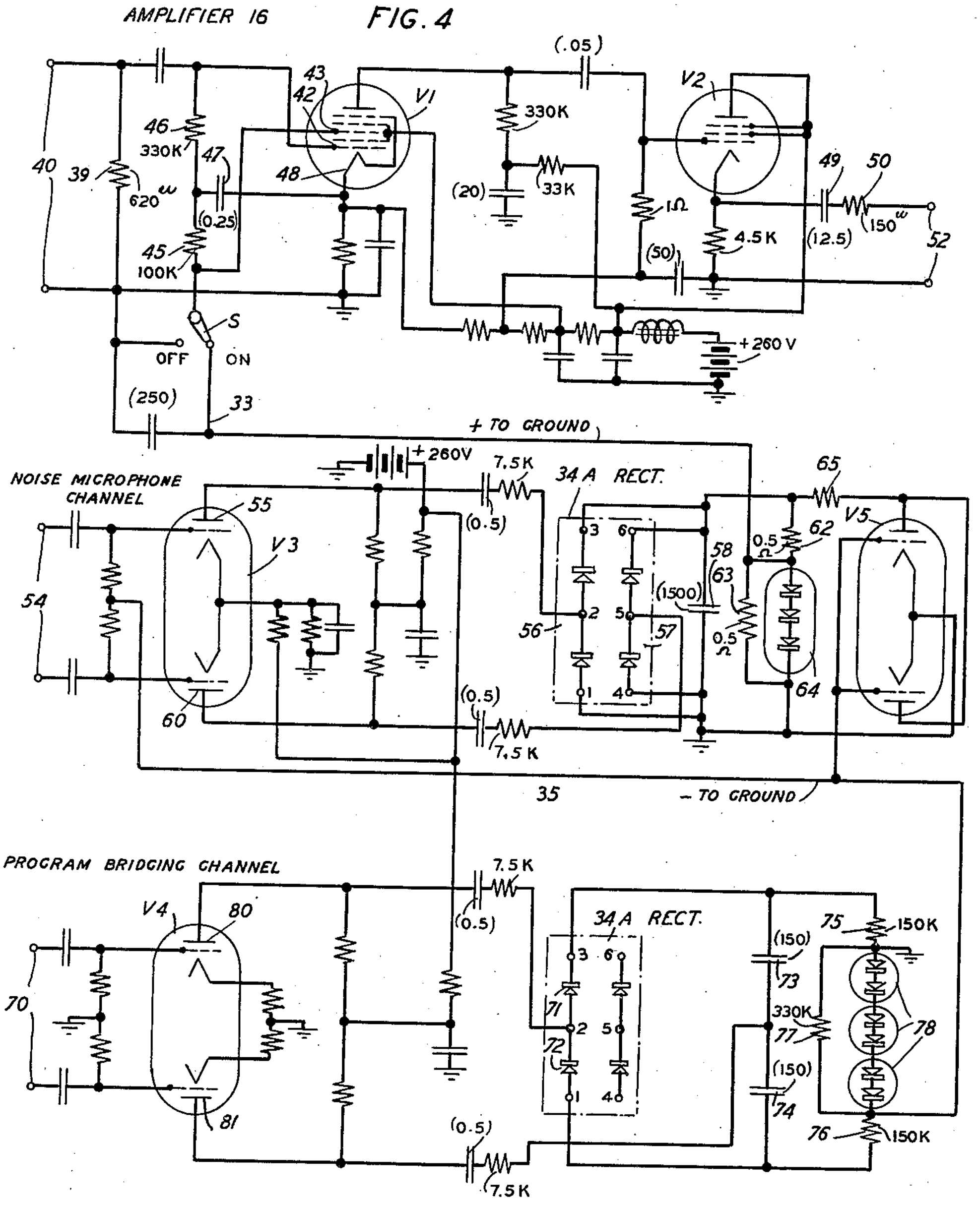
Fig. 4 is a schematic diagram of the circuits controlling the gain of the variable gain amplifier of Fig. 1.

As will appear from the description of the circuit of Fig. 4, the control voltage on conductor 33 varies with the noise level in the listening area during an interval of no program, but is substantially constant during a program rendition at the value it had when the rendition began. This result is brought about by a deactivating tie including amplifier-rectifier 34 between the output of line amplifier 18 and the input of amplifier-rectifier 31. Amplifier-rectifier 34 is effectively energized when program voltage appears at the output of line amplifier 18; on conductor 35 a rectified voltage proportional to this output program voltage disables both amplifier-rectifier 31 and time-constant shunt 32 to prevent further change of control voltage on conductor 33. The last-mentioned rectified voltage is derived from a time-constant circuit included in amplifier-rectifier 34; the time constant of this circuit is such that very quickly after the program rendition ceases the deactivating voltage on conductor 35 disappears, restoring amplifier-rectifier 31 and shunt circuit 32 to the condition in which a gain-control voltage, representative of the noise level in the listening area controls the gain of amplifier 16.

By the action of the gain-control circuit above functionally described, the program channel gain is fixed in accordance with the noise level in the listening area prior to a program rendition, is held at this value during the rendition and is allowed to become again variable with noise after the rendition ceases. As before mentioned, the program gain during the no-program interval is caused to rise enough to enable the sound output from loudspeaker 24 to be heard satisfactorily above the noise.

The circuits of variable gain amplifier 16 and of the components included in the gain-control unit are shown in detail in Fig. 4.

Referring now to Fig. 4, terminals 40 receive the voltage across the 600-ohm output of preamplifier 14 in the program channel. These terminals are shunted by 620-ohm resistor 39 matching the output impedance of preamplifier 14. The program voltage between terminals 40 is applied between ground and control grid 42 of tube V1, suitably a 1612. To shielded screen grid 43 of tube V1 there is applied, when switch S is closed right, the voltage on conductor 33. Tube V1 is a variable-mu tube, the gain of which is varied by a direct-current voltage on grid 43 in the manner fully disclosed by J. E. Dickert in United States Patent 2,245,652, June 17, 1941. Grid 43 and conductor 33 are connected to control grid 42 through a high resistance comprising resistors 45 and 46 in series, the junction of which is coupled by condenser 47 to cathode 48 of tube V1. When switch S is closed left, screen grid 43 is grounded and the voltage gain of the amplifier is unity, or zero db; this is the condition when in the absence of noise in the listening area the operator adjusts the gain of line amplifier 18, Fig. 1, to obtain a satisfactory sound level from loudspeaker 24. By a conventional connection, the output voltage of tube V1 is, in either closing of switch S, supplied to a cathode follower tube V2, for example a 6J7. The cathode-to-ground voltage of tube V2 is via condenser 49 and pad resistor 50 supplied to the input terminals 52 of line amplifier 18, having an input impedance of 600 ohms in the usual case and adjustable voltage gain. Tube V2 may, if desired, be replaced by a transformer connected between tube V1 and amplifier 18 of the proper impedance ratio between the anode circuit of tube V1 and the input circuit of amplifier 18. While cathode heating power for tubes V1 and V2, as for all other tubes shown in Fig. 4, is understood but not shown, suitable numerical values are shown for the especially significant circuit elements for all tubes in microfarads and ohms (ω), thousands (K) of ohms or megohms (Ω).

The noise level voltage from microphone 25, amplified by amplifiers 27 and 29, is from terminals 54 of the latter applied to the grids of the triodes of tube V3 in push-pull connection. Tube V3 is suitably a 6SN7. Anode 55 is connected through a condenser and resistor, as shown, to the mid-point (terminal 2) of a varistor string 56 (terminals 1, 2, and 3) of a 34–A rectifier, whose elements are directed as shown relatively to the voltage from anode 55. The other terminals of this varistor string are connected to condenser 58, 1500 microfarads in capacity and of suitable voltage rating. Anode 60 is, through a condenser and resistor, as shown, connected to the mid-point (terminal 5) of a second varistor string 57 (terminals 4, 5, and 6) of the same 34–A rectifier, whose elements are directed as shown relatively to the voltage from anode 60. The other terminals of this varistor string are also connected to condenser 58, with similar poling as that of the first string, so that varistor terminals 1 and 4 go to one condenser connection, and terminals 3 and 6 to the other. Condenser 58 will charge to a rectified voltage proportional to the peaks of noise voltage amplified in tube V3. Condenser 58 is grounded at its terminal to which terminals 1 and 4 of the 34–A rectifier are attached. The other terminal of condenser 58 is positive to ground. Discharge of the 1500-microfarad condenser through the anode paths of tube V3 is prevented by the 0.5-microfarad condensers shown between anode 55 and terminal 2 of varistor string 57 and between anode 60 and terminal 5 of varistor string 57.

Across condenser 58 are connected two shunt circuits: one is made up of 0.5-megohm resistors 62 and 63 in series, the latter shunted by varistor 64, poled as shown and suitably a 41–B type varistor comprising three one-sixteenth inch pellets of thallium-copper oxide; the other shunt circuit is 75,000-ohm resistor 65 in series with the parallel connection of the anode-cathode circuits of the pair of triodes contained in tube V5, also a 6SN7. A portion, positive to ground, of the voltage across condenser 58 appears on conductor 33 leading from the junction of resistors 62 and 63 to the right-hand terminal of switch S; this is the gain-control voltage for the program channel.

Tubes V3 and V5 are both initially conducting, so that condenser 58 is shunted by 75,000 ohms (neglecting the anode-cathode impedance of V5) as well as by the shunt comprising resistors 62 and 63 and varistor 64. At a threshold noise level, the voltage in conductor 33 makes no appreciable change in the gain of tube V1 from the zero gain originally arranged.

With rising noise level, the voltage of condenser 58 rises correspondingly, and up to a certain value of this condenser voltage, the control voltage on conductor 33 does the like. At the lower values of voltage across the parallel combination of resistor 63 and varistor 64, the varistor impedance is large in comparison with that of the resistor shunting it, so that in this range of noise levels conductor 33 has a voltage equal to one-half the condenser voltage. At the higher levels of noise, the effect of the fall in varistor impedance with higher voltage across it reduces progressively the impedance between ground and the junction of resistors 62 and 63, so that a smaller fraction of the now larger condenser voltage appears on conductor 33. The gain of tube V1 therefore increases at first in step with increase in noise level, but progressively less and less rapidly.

Figure 2:
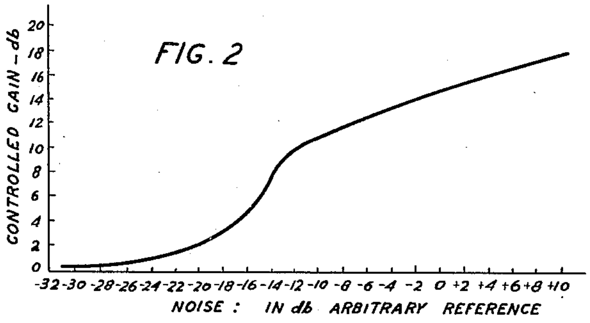
Fig. 2 shows a curve characteristic of the relationship between ambient noise level and the gain of the reproducing channel.

Fig. 2 shows the relation of change in gain of tube V1 with change in noise level in the listening area. The curve relates to the circuit arrangement shown in Fig. 4.

The time constant of the RC shunt comprising the 1,500-microfarad condenser and the circuits shunting them is determined, as long as tube V5 is conducting, principally by the 75,000-ohm resistor 65. The time constant is approximately 113 seconds (1,500×0.075). If the interval between program conditions is a matter of minutes, the program channel gain will be set in accordance with the average noise level during, say, the last half minute before the next program begins.

It is requisite to freeze the program channel gain, when program rendition begins, at the value just established by the noise microphone channel and to disable the latter channel so that no gain change shall take place during the program. For this purpose the deactivating tie from the program channel to the microphone channel is provided through amplifier-rectifier 34. Its effect is to bias to cut-off tubes V3 and V5.

Amplifier-rectifier 34 is bridged across the program channel, between line amplifier 18 and power amplifier 20, by input leads 70, Figs. 1 and 4. It comprises tube V4, a 6SN7, of which the grids of the two triodes are connected in push-pull to leads 70 to serve as an isolating amplifier between program and noise channels. Anode 80 of V4 is connected through a condenser and resistor, as shown, to the mid-point 2 of one of the varistor strings 1, 2, and 3 of a 34–A rectifier. The varistor elements 71 and 72 of this varistor string are directed as shown relatively to the voltage from anode 80. The other terminals 1 and 3 of the varistor string are connected to condensers 73 and 74, each 150 microfarads, in series. Anode 81 of V4 is connected through a condenser and resistance to the junction of condensers 73 and 74. It will be obvious that condensers 73 and 74 are charged, in the same polarity but alternately, to a rectified voltage proportional to the peaks of the program voltage amplified in tube V4. Shunting these 150-microfarad condensers is the circuit comprising resistors 75 and 76 in series with a voltage limiter made up of resistor 77 in shunt with three 40–A varistors, in series, 78. Varistors 78, like varistor 64, are thallium copper oxide elements, and produce a limiting effect on the voltage, negative to ground, applied via conductor 35 to the grid of tubes V3 and V5 to bias those tubes to cut off when a threshold level of program voltage appears between terminals 70.

When a program begins, the voltage at terminals 70 results in a negative voltage between ground and the junction of resistors 76 and 77 which is at first about three-fourths the voltage across condensers 73 and 74 but falls to slightly more than one-fourth the highest voltage to which the condensers are charged responsively to the sound reproduction voltage applied to the input of tube V4.

At the moment tubes V3 and V5 are cut off on the beginning of a program, the gain-control voltage on conductor 33 is that determined by the noise level in the latter part of the preceding interval of no program and the only circuit shunting condenser 58 is resistor 62 in series with the parallel combination of resistor 63 and varistor 64. The impedance of the parallel combination varies from one-half megohm to 10,000 ohms, about, with the values of resistance 63 indicated in Fig. 4, as the rectified applied voltage varies from 0.3 volt to about 1.3 volts. The decay of the voltage on conductor 33 depends on the time constant of the discharge circuit, and this time constant varies between the extreme values of 1,500 seconds (1,500 microfarads×1 megohm) to 750 seconds (1,500 microfarads×0.5 megohm) depending on whether the preceding noise was moderate or great. Inasmuch as a program selection of only a few minutes is the usual case, the time constants just computed are adequate to insure that during such a program the gain of the program channel shall remain that obtaining when the program began.

When the program closes, the voltage on conductor 35 quickly subsides to a value permitting the renewed conductivity of tubes V3 and V5, thus restoring to the microphone channel the control of program channel gain. The decay of voltage on conductor 35 is determined by the time constant of condensers 73 and 74 in series, paralleled by resistors 75 and 76 in series with the parallel circuit of resistor 77 and varistors 78. This time constant varies from about 47 seconds at low terminal program levels (75×0.63) to about 23 seconds when the final program level is high. Thus, the noise microphone channel regains control of the program channel gain within the first half minute after the program selection ends. As the noise level varies during the interval before the next program, the program channel gain is fixed by the noise microphone channel in accordance therewith.

The charging time constant of condenser 58 in the noise amplifier channel is about 23 seconds; that of condensers 73 and 74 in the program bridging channel is about 1 second. In other words, the voltage on conductor 33, which fixes the gain of amplifier 16 of Fig. 1, is slowly established as compared with the later establishment of the deactivating voltage on conductor 35. The gain-control voltage on conductor 33 is very slowly dissipated, while the deactivating voltage rapidly falls when the program ceases, and the time constant determining the rate of all is less the higher the sound level at which the program ends.

It is readily seen, from the foregoing description of the limiting effect of varistor 64, that when the noise level during a program interval is high enough to charge condenser 58 to a voltage which despite limiting drives the gain of amplifier 16 to the highest value, the ensuing program finds the discharge time constant of condenser 58 about half what it is for the low noise levels, with the result that the high gain of amplifier 16 falls faster than it would from an intermediate gain. This is a desirable effect, because if the room noise, loud during the interval between programs, should decrease during the rendition of a succeeding program selection, the sound level would be excessively high.

Figure 3:
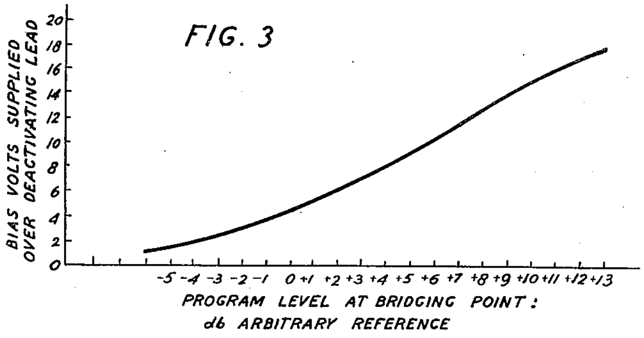
Fig. 3 shows a curve characteristic of the limiting elements involved in the deactivating circuit shown in Fig. 4.

Fig. 3 exhibits a curve relating the program sound level to the value of the deactivating voltage on conductor 35. The limiting action of varistors 78 prevents the bias voltage on conductor 35 from appreciably exceeding 14 volts and reduces the discharge time constant, at the higher voltages, of the network comprising the 150-microfarad condensers 73 and 74 and the associated shunt circuit. This limiting provision is a refinement here that may be omitted, if the greatest simplicity is aimed at in a particular system.

The limiting characteristics shown in Figs. 2 and 3 are those of the specific varistor-resistor arrangements in shunt with the 1,500-microfarad and with the 150-microfarad condensers, respectively. By redesign of these combinations of varistors and resistors, a large variety of limiting characteristics may be provided for either the noise microphone channel or the program bridging channel, or both. Such refinements of limiting action are not essential to the present invention and therefore are not described herein.

In the unusual cases where a burst of noise in the listening area occurs during the rendition of a program, tube V3 may be driven to conductive condition despite the bias voltage on conductor 35. The conductivity so conferred upon tube V3 does not affect the non-conducting condition of tube V5, and besides provides only a low value of amplification in tube V3. There is accordingly no serious effect on the voltage on conductor 33, and what effect there is is soon dissipated. The momentary rise in program sound level, due to this noise burst, is thus not proportionate to the burst and is evanescent.

The reproduction of a program, either from a record or by direct transmission, is thus arranged to result in a program sound level in the listening area satisfactorily higher than the noise level therein, except when during the reproduction there arises an inordinate burst of noise. The limiting action of varistor 64 prevents the increase of program channel gain to such a value as would make the sound level during program rendition unpleasantly high if the noise in the listening area falls compared with the noise in the preceding interval, and insures stability in the operation of the system. As previously stated, the interval adjusting system herein disclosed has an advantage over the known continuously adjusting systems in that the artistic character of the reproduction is not impaired by fluctuations in program channel gain accompanying fluctuations in noise level during a program.

What is claimed is:

1. Means for controlling the level of sound reproduced by a sound program system in a listening area to override noise therein, said system including an electrical amplifying channel comprising a variable gain amplifier and a loudspeaker operated by the output of the channel at a level fixed by the gain of the amplifier, including a microphone in the area responsive to the noise therein, an amplifying system controlled by the microphone to provide a voltage varying non-linearly with the noise, means for applying the voltage to vary the gain of the amplifier in an interval preceding the rendition of a program and means controlled by the program system to disable the microphone system from further variation of gain during the rendition of a program.

2. A sound program installation for reproducing sound in a listening area at a level overriding disturbing noise therein comprising an electrical sound program channel including a variable gain amplifier and a loudspeaker operated by the output of the program channel, a microphone channel responsive to noise in the area, means for producing from the output of the microphone channel a first unidirectional voltage of magnitude corresponding non-linearly to the noise level, means for applying the voltage to vary the gain of the variable gain amplifier in accordance with the noise level, means connected with the program channel for producing a second unidirectional voltage of magnitude corresponding non-linearly to the program sound level and means for applying the second voltage to disable the means for producing the first voltage.

3. A sound program installation as in claim 2 including means for limiting the first voltage at extreme noise levels.

4. A sound program installation as in claim 3 including means for limiting the sound voltage at extreme program sound levels.

5. A sound reproducing system arranged to reproduce a sound program in a noisy listening area to override the noise therein comprising a source of sound-representative voltage, amplifying means including a variable gain amplifier for amplifying said voltage, a loudspeaker driven by the amplified sound voltage, a microphone in the listening area providing an alternating voltage representative of the noise level in the area, means for rectifying the provided voltage, means for progressively limiting the increase of the rectified voltage with progressive increase in noise level, means for applying the limited voltage to vary correspondingly the gain of the variable gain amplifier, means connected with the amplifying means to provide a second rectified voltage of magnitude correspondent to that of the amplified sound voltage, means for progressively limiting the increase of the second rectified voltage with progressive increase of the amplified sound voltage and means responsive to the second limited voltage for disabling the gain-varying means.

WALTER F. KANNENBERG.

REFERENCES CITED

The following references are of record in the file of this patent:

UNITED STATES PATENTS

| Number | Name | Date |
|---|---|---|
| 2,338,551 | Stanko | Jan. 4, 1944 |
| 2,462,532 | Morris | Feb. 22, 1949 |